US012595683B2

(12) United States Patent
Lee

(10) Patent No.: US 12,595,683 B2
(45) Date of Patent: Apr. 7, 2026

(54) ANTI-VANDAL COMBINATION ROTARY LOCK

(71) Applicant: ABA LOCKS INTERNATIONAL CO., LTD., New Taipei City (TW)

(72) Inventor: Miko Lee, New Taipei City (TW)

(73) Assignee: ABA Locks International Co., Ltd., New Taipei City (TW)

( * ) Notice: Subject to any disclaimer, the term of this patent is extended or adjusted under 35 U.S.C. 154(b) by 59 days.

(21) Appl. No.: 18/909,115

(22) Filed: Oct. 8, 2024

(65) Prior Publication Data

US 2026/0062956 A1 Mar. 5, 2026

(30) Foreign Application Priority Data

Aug. 29, 2024 (TW) ................................ 113209376

(51) Int. Cl.
*E05B 37/02* (2006.01)
*E05B 9/00* (2006.01)

(52) U.S. Cl.
CPC ................ *E05B 37/02* (2013.01); *E05B 9/00* (2013.01)

(58) Field of Classification Search
CPC ............. E05B 37/0003; E05B 37/0048; E05B 37/0058; E05B 37/02
See application file for complete search history.

(56) References Cited

U.S. PATENT DOCUMENTS

| | | | | |
|---|---|---|---|---|
| 7,958,757 B1 * | 6/2011 | Lee | E05B 13/103 | |
| | | | 70/284 | |
| 8,316,675 B2 * | 11/2012 | Yang | E05B 13/106 | |
| | | | 70/284 | |
| 10,030,415 B2 * | 7/2018 | Taylor | E05B 37/0034 | |
| 12,054,968 B2 * | 8/2024 | Wu | E05G 1/04 | |
| 12,110,712 B2 * | 10/2024 | Li | E05B 37/02 | |
| 12,320,152 B2 * | 6/2025 | Li | E05B 37/0034 | |
| 12,371,926 B2 * | 7/2025 | Hartmann | E05B 37/0034 | |
| 2019/0016511 A1 * | 1/2019 | Yang | E05B 65/0075 | |
| 2022/0290463 A1 * | 9/2022 | Wu | E05B 37/0048 | |
| 2024/0102313 A1 * | 3/2024 | Lee | E05B 37/02 | |
| 2024/0344363 A1 * | 10/2024 | Hu | E05B 65/5269 | |
| 2025/0027338 A1 * | 1/2025 | Liang | E05B 37/0075 | |

* cited by examiner

*Primary Examiner* — Kristina R Fulton
*Assistant Examiner* — Noah Horowitz
(74) *Attorney, Agent, or Firm* — Rosenberg, Klein & Lee

(57) ABSTRACT

An anti-vandal combination rotary lock has a lock casing sleeving a front cover outside the lock casing, a lock core seat mounted in the lock casing, and a combination lock assembly and a clutch assembly mounted on the lock core seat. The clutch assembly can selectively connect or separate the lock core seat and a lock tongue. The user must first adjust the combination lock assembly to an unlocked state, and then holds and presses the front cover to drive the lock core seat to connect the lock tongue through the clutch assembly, so that the lock tongue is rotated to an unlocked position or a locked position. When the password entered is incorrect, the lock core seat cannot be driven through the front cover to connect the lock tongue through the clutch assembly.

10 Claims, 13 Drawing Sheets

ANTI-VANDAL COMBINATION ROTARY LOCK

BACKGROUND OF THE INVENTION

1. Field of the Invention

The present invention relates to a combination lock, especially to an anti-vandal combination rotary lock that can prevent unauthorized forced-opening when the password entered is incorrect.

2. Description of the Prior Arts

A combination lock is a commonly used lock. The user can unlock or lock the lock core by dialing each one of the character wheels, so there is no need to carry a key, thereby improving the convenience of using the lock.

The conventional combination lock mainly includes a lock casing and a front cover that are connected to each other. The lock casing is configured to be fixed at an installation location, and the front cover can rotate relative to the lock casing. A lock core is accommodated inside the lock casing, and a back end of the lock core protrudes from the lock casing and is connected to a lock tongue. A front end of the lock core is fixed with the front cover, and the front end of the lock core comprises a combination lock assembly. The combination lock assembly includes a limiting shaft and multiple character wheels sleeving the limiting shaft. An end of the limiting shaft protrudes into a locating slot of the lock casing. The character wheels respectively protrude into multiple character windows on the front cover. Each one of the character wheels is provided with numerals, and the user can determine the angular position of the character wheel relative to the limiting shaft according to the numeral on the character wheel toward the outside of the front cover.

When each one of the character wheels is rotated to a respective unlocked angle, each one of the character wheels is unlocked from the limiting shaft, so that the limiting shaft can move along the axial direction of the limiting shaft. At this time, when the user rotates the front cover and the lock core, the limiting shaft can be pressed down by the inner wall of the lock casing and moved out of the locating slot of the lock casing, so that the lock core drives the lock tongue to move between a locked position and an unlocked position. When at least one of the character wheels is arbitrarily rotated away from the unlocked angle, the limiting shaft and the character wheel are locked with each other and the limiting shaft cannot move up or down along the axis. At this time, the limiting shaft cannot be pressed and remains engaged in the locating slot of the lock casing, so that the user cannot rotate the front cover, the lock core and the lock tongue.

However, the problem with said conventional combination lock is that since the lock core is directly connected to the lock tongue, a person who does not know the correct password can still forcefully wrench the lock core through the front cover to drive the lock tongue to rotate to the unlocked position. Therefore, the security of the conventional combination lock still needs to be improved.

To overcome the shortcomings, the present invention provides an anti-vandal combination rotary lock to mitigate or obviate the aforementioned problems.

SUMMARY OF THE INVENTION

The main objective of the present invention is to provide an anti-vandal combination rotary lock that is configured to prevent the lock from being forcibly opened without entering the correct password.

The anti-vandal combination rotary lock comprises a lock casing, a front cover, a lock core seat, a combination lock assembly, and a clutch assembly.

A front end of the lock casing is an open end, and a back end-surface of the lock casing is a closed end. The lock casing comprises an outer sleeve and a limiting slot. The outer sleeve is mounted on the back end-surface of the lock casing. The limiting slot is concaved on an inner wall of the lock casing, and a bottom of the limiting slot is a concaved curved surface.

The front cover sleeves the lock casing from the front end of the lock casing and can rotate and move forward and backward relative to the lock casing. A back end of the front cover is an open end, and said back end of the front cover is configured to contain the lock casing. A front end of the front cover is a closed end. The front cover comprises multiple character windows. The character windows are formed on the front end of the front cover.

The lock core seat is mounted in the lock casing, and the lock core seat and the front cover are fixed to each other. The lock core seat comprises an inner rod and multiple wheel slots. The inner rod extends backward along an axial direction from a back end-surface of the lock core seat and can extend into the corresponding outer sleeve of the lock casing. The wheel slots are respectively corresponding to the character windows of the front cover in location. Each one of the wheel slots is formed through a front end-surface of the lock core seat.

The combination lock assembly is mounted on the front end-surface of the lock core seat and comprises a limiting shaft, multiple character wheels, and a limiting elastic unit. The limiting shaft can move along an axial direction of the limiting shaft relative to the lock core seat. The limiting shaft comprises a limiting end. The character wheels sleeve the limiting shaft and are respectively mounted in the wheel slots of the lock core seat. Each one of the character wheels can rotate relative to the limiting shaft. When all the character wheels rotate relative to the limiting shaft to corresponding unlocked angles respectively, the character wheels and the limiting shaft are unlocked, so that the limiting shaft can move axially. When any one of the character wheels is rotated away from the corresponding unlocked angle, the character wheels and the limiting shaft are locked with each other, so that the limiting shaft cannot move axially. The limiting elastic unit sleeves the limiting shaft. Two opposite ends of the limiting elastic unit respectively abut the limiting shaft and one of the character wheels. The limiting elastic unit makes the limiting shaft move axially, so that the limiting end of the limiting shaft abuts the inner wall of the lock casing.

The clutch assembly is mounted between the outer sleeve of the lock casing and the inner rod of the lock core seat and comprises a connecting unit, a connecting sleeve, and a clutch elastic unit. The connecting unit is mounted on a back end of the inner rod, and a cross-section of the connecting unit is non-circular. The connecting sleeve is rotatably mounted in the outer sleeve of the lock casing, and the connecting sleeve comprises a front end, a back end, and a connecting recess. The back end of the connecting sleeve protrudes from the outer sleeve and is connected to a lock tongue. The connecting recess is concavely formed on the front end of the connecting sleeve. A ross-section of the connecting recess is non-circular, and a shape of said cross-section of the connecting recess matches a shape of the cross-section of the connecting unit. The connecting unit can be driven to move into the connecting recess and be engaged with the connecting sleeve. The clutch elastic unit sleeves the inner rod of the lock core seat. Two ends of the clutch elastic unit respectively abut the back end-surface of the lock core seat and the lock casing.

The user must first adjust the combination lock assembly to the unlocked state by entering the correct password, so that the limiting shaft can move axially. Then the user holds and presses the front cover to drive the lock core seat and the connecting unit to move into the connecting sleeve to be further engaged and connected with the connecting sleeve. Finally, the front cover is rotated to sequentially drive the lock core seat, the connecting sleeve, and the lock tongue to rotate, and the lock tongue is rotated to an unlocked position or a locked position. Not knowing the correct password, a thief cannot drive the lock core seat and the connecting unit through the front cover to be engaged with the connecting sleeve but can only drive the front cover and the lock core seat to idle, and cannot further forcefully apply torque to drive the connecting sleeve and the lock tongue to rotate.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
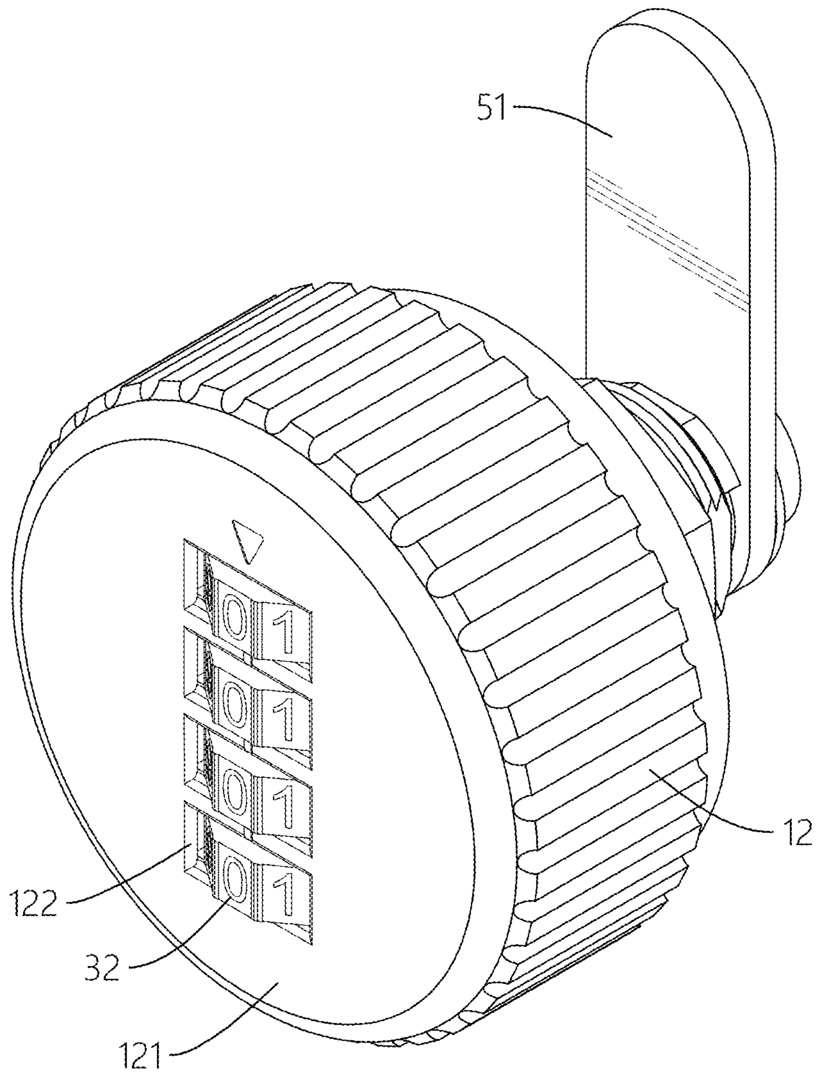
FIG. 1 is a perspective view of an anti-vandal combination rotary lock in accordance with the present invention.
Figure 2:
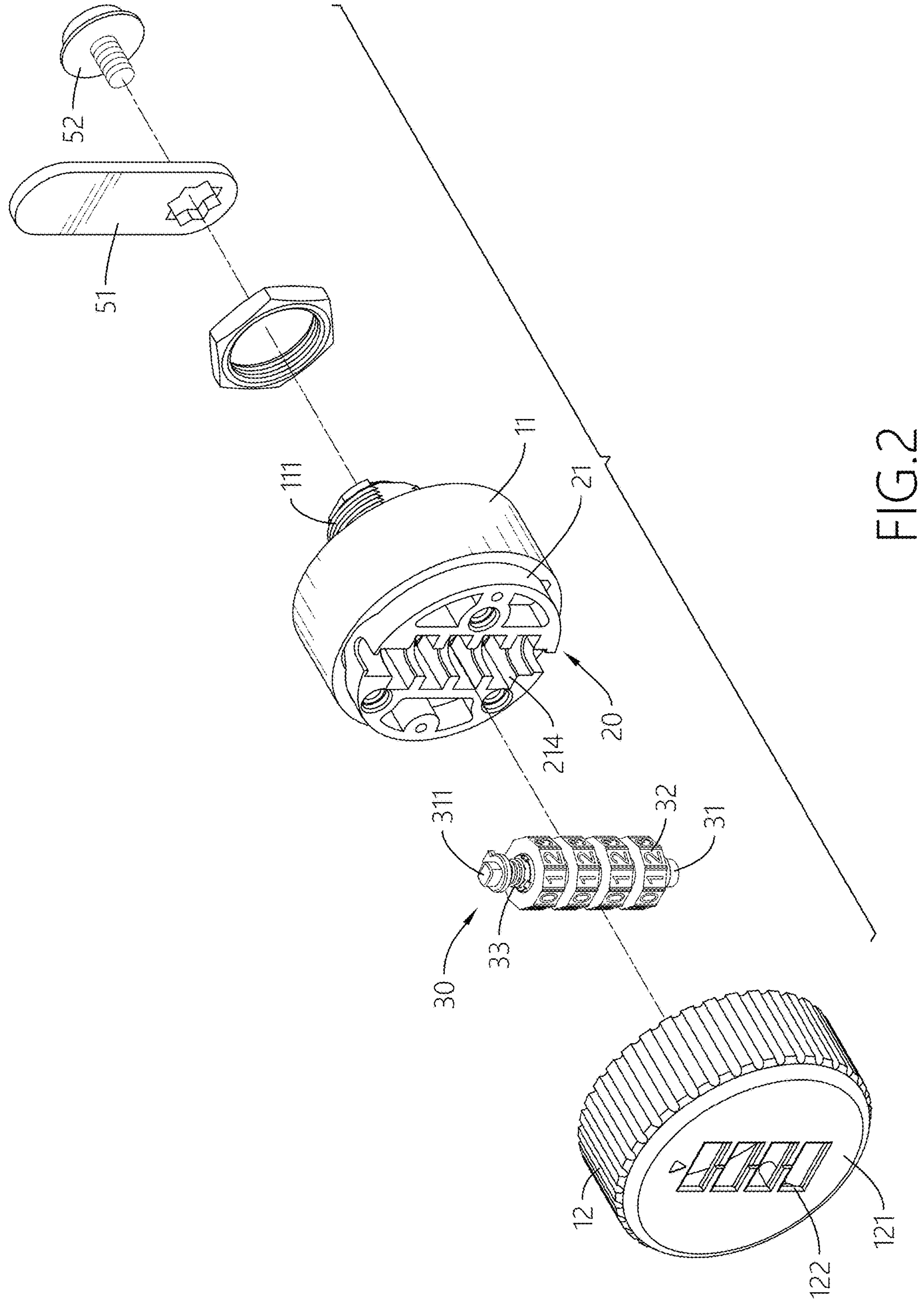
FIG. 2 is an exploded view of the anti-vandal combination rotary lock in FIG. 1, shown in a front view.
Figure 3:
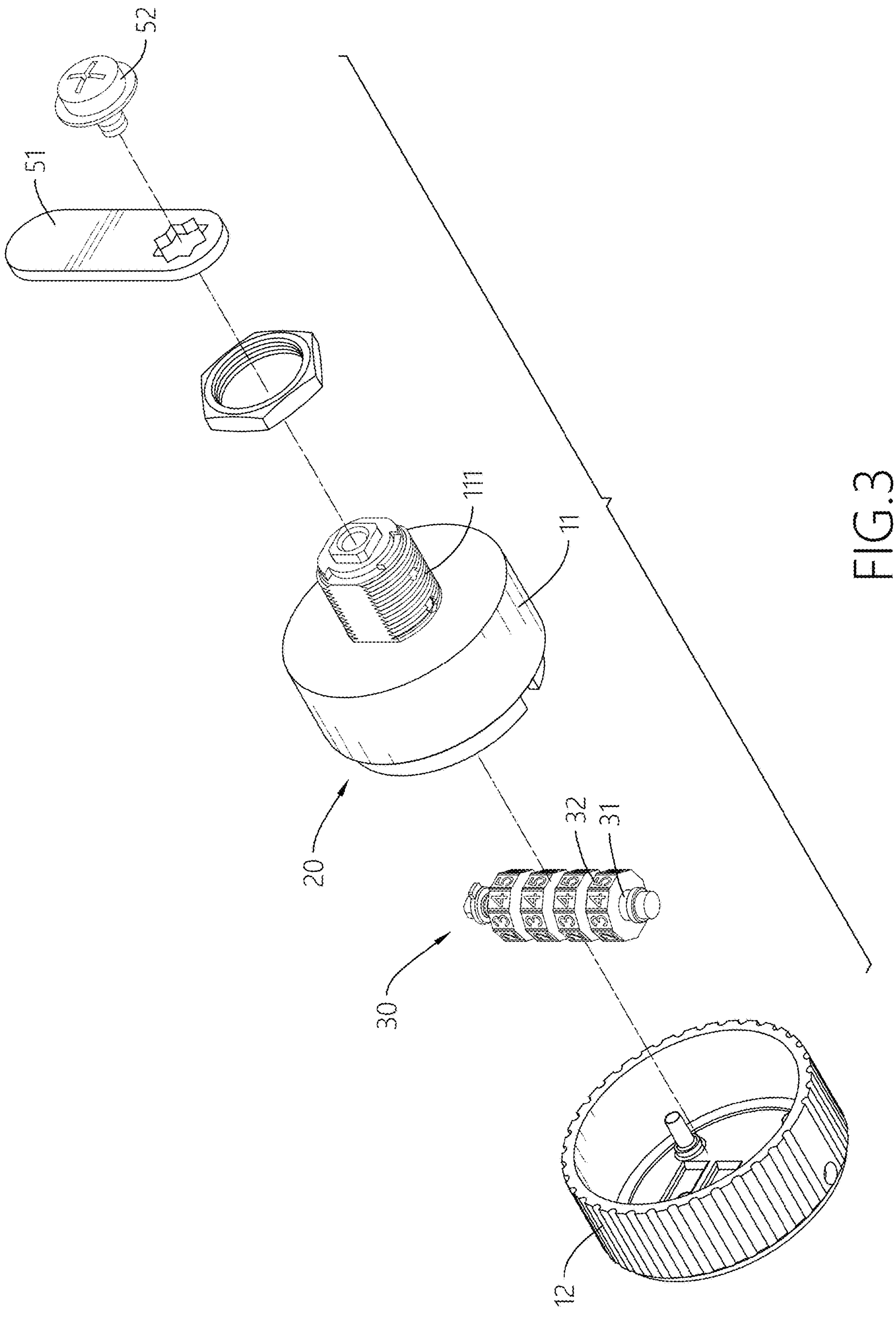
FIG. 3 is an exploded view of the anti-vandal combination rotary lock in FIG. 1, shown in a back view.
Figure 4:
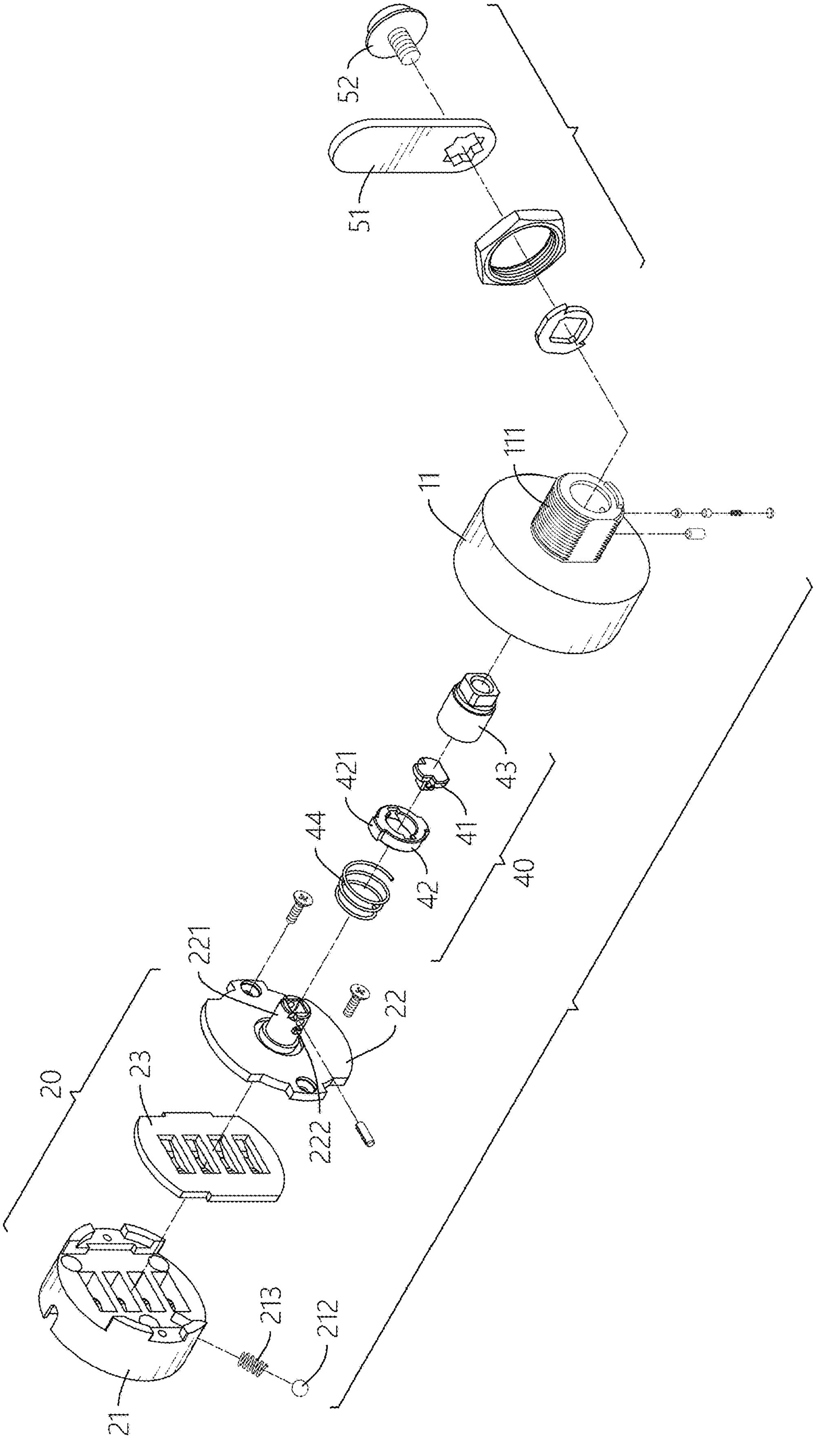
FIG. 4 is an exploded view of partial components of the anti-vandal combination rotary lock in FIG. 1.
Figure 5:
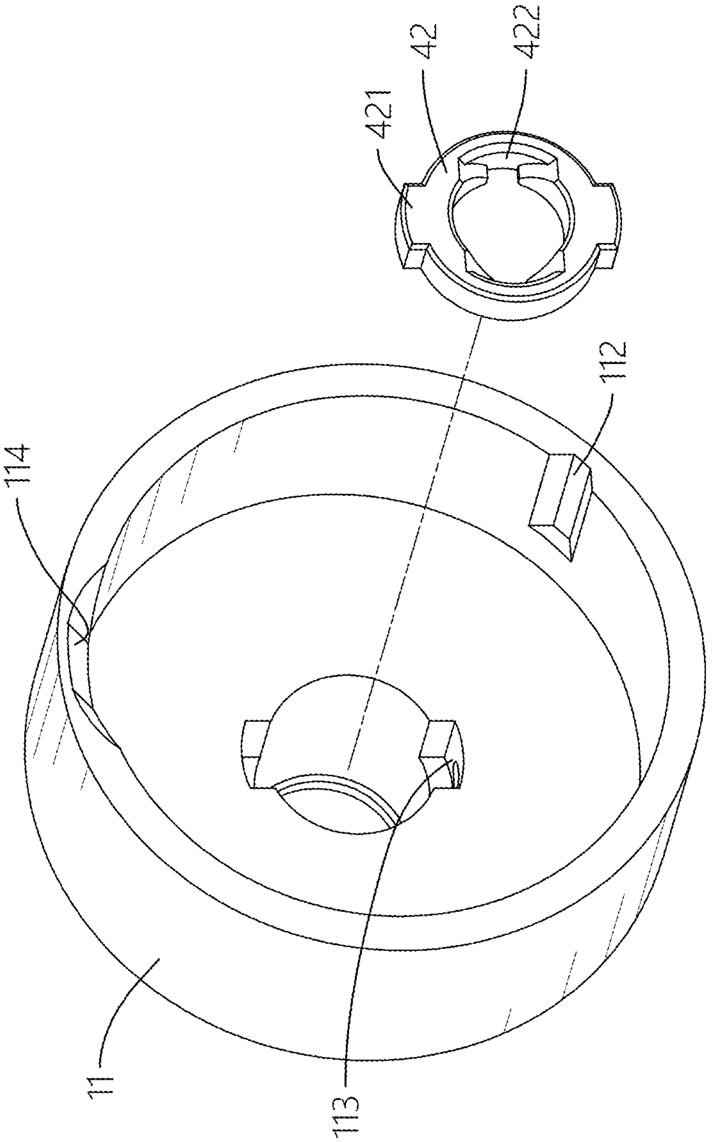
FIG. 5 is an exploded view of the lock casing and the fixing ring of the anti-vandal combination rotary lock in FIG. 1.
Figure 6:
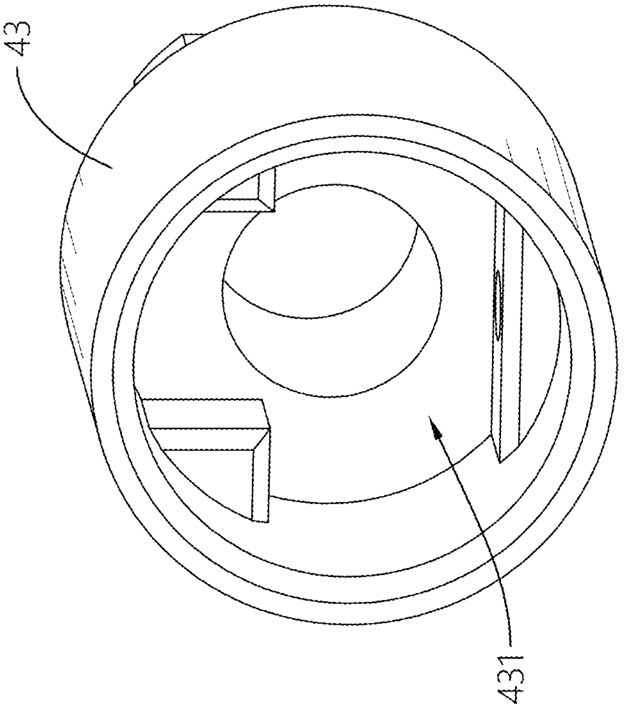
FIG. 6 is a perspective view of the connecting sleeve of the anti-vandal combination rotary lock in FIG. 1.
Figure 7:
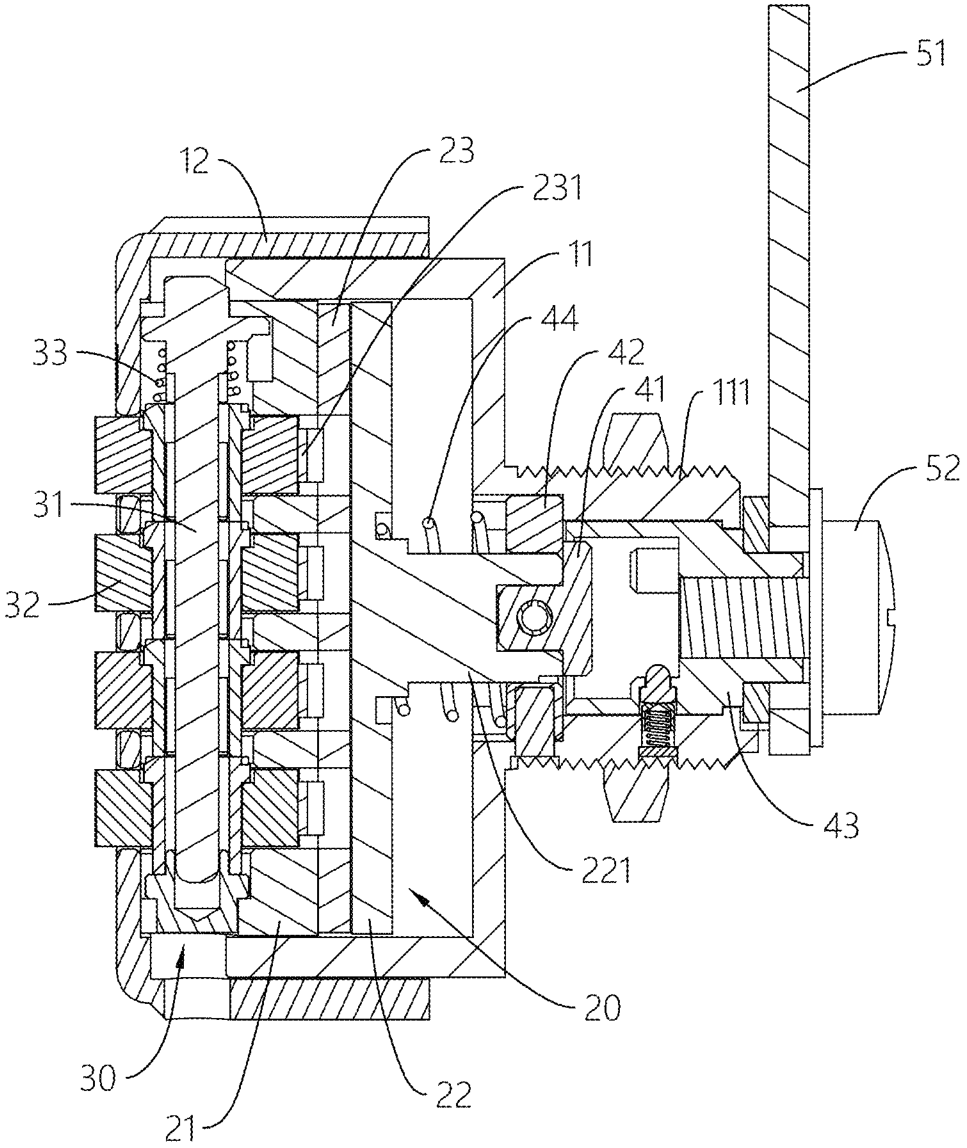
FIG. 7 is a side sectional view of the anti-vandal combination rotary lock in FIG. 1, shown in the locked state.
Figure 8:
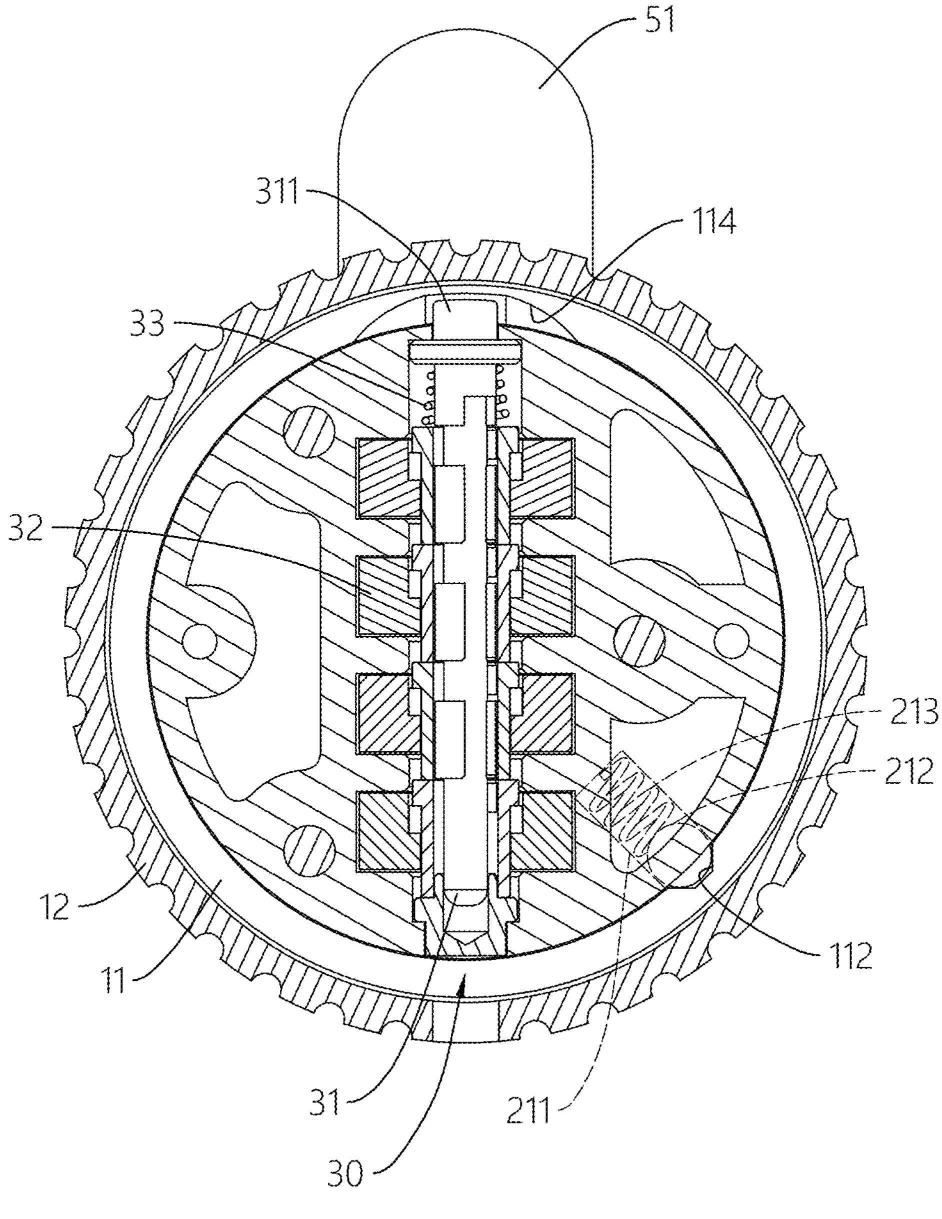
FIG. 8 is a front sectional view of the anti-vandal combination rotary lock in FIG. 1, shown in the locked state.
Figure 9:
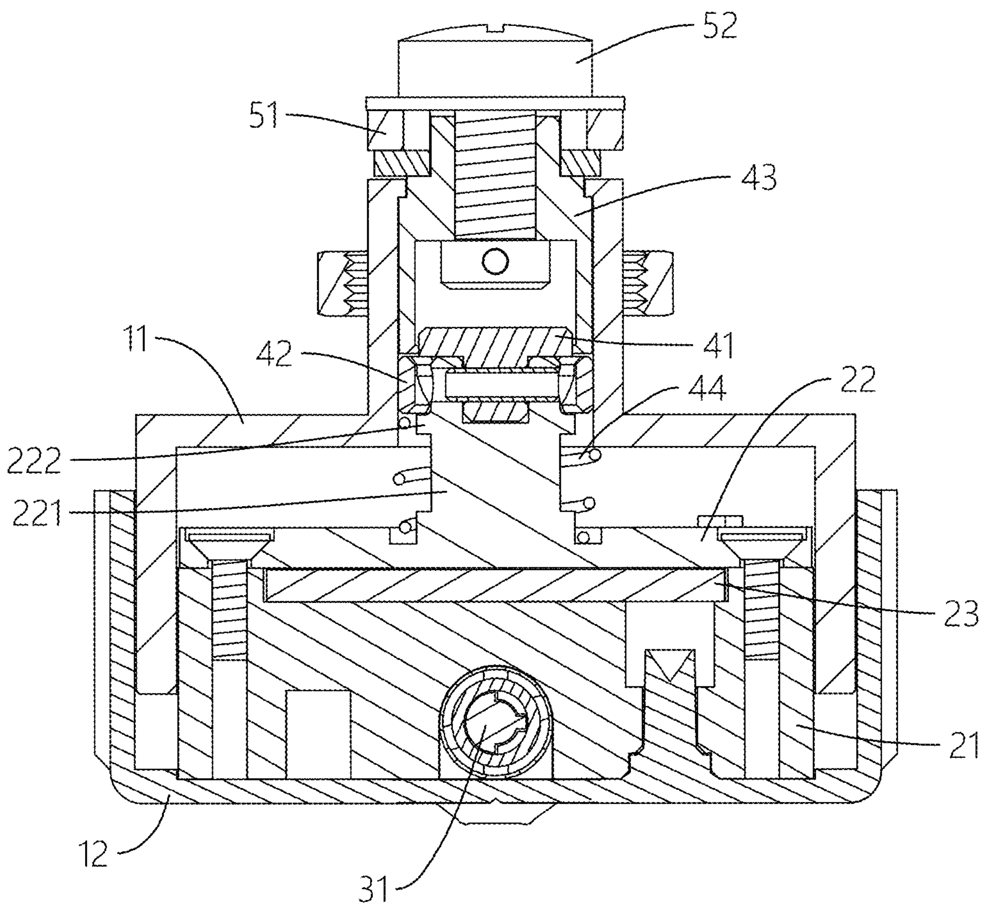
FIG. 9 is an upper sectional view of the anti-vandal combination rotary lock in FIG. 1, shown in the locked state.
Figure 10:
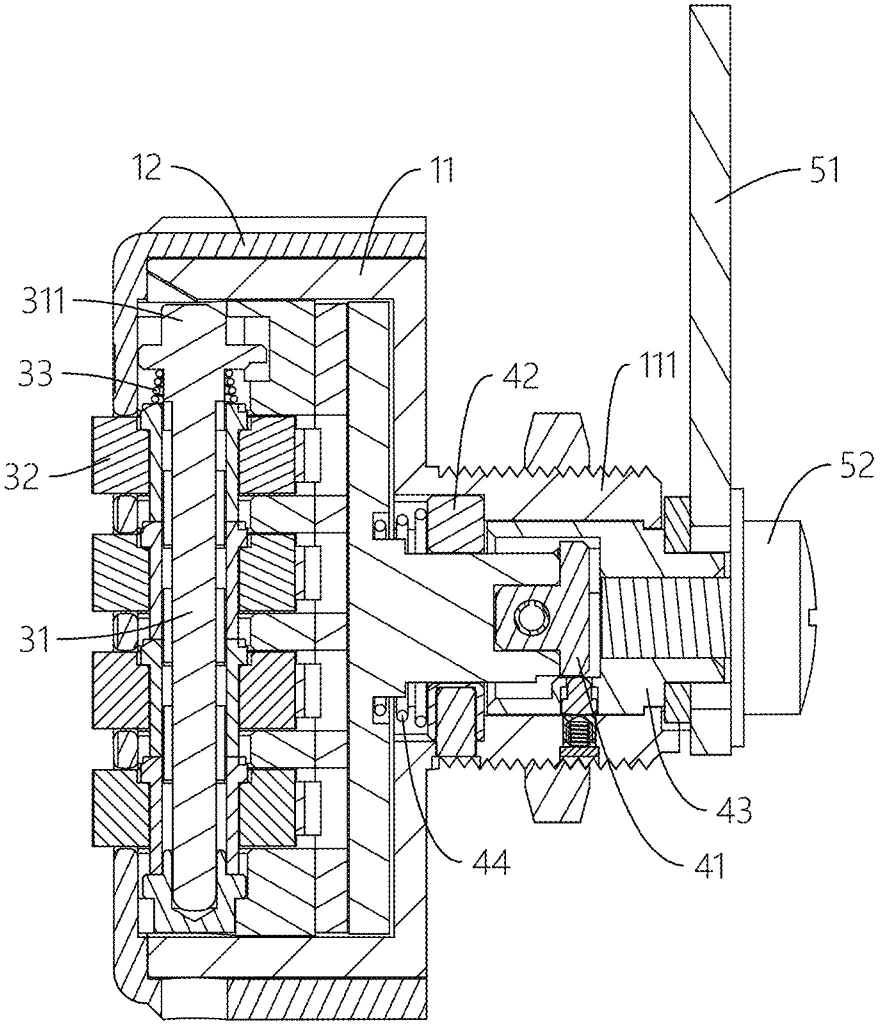
FIG. 10 is a side sectional view of the anti-vandal combination rotary lock in FIG. 1, shown in the unlocked state.
Figure 11:
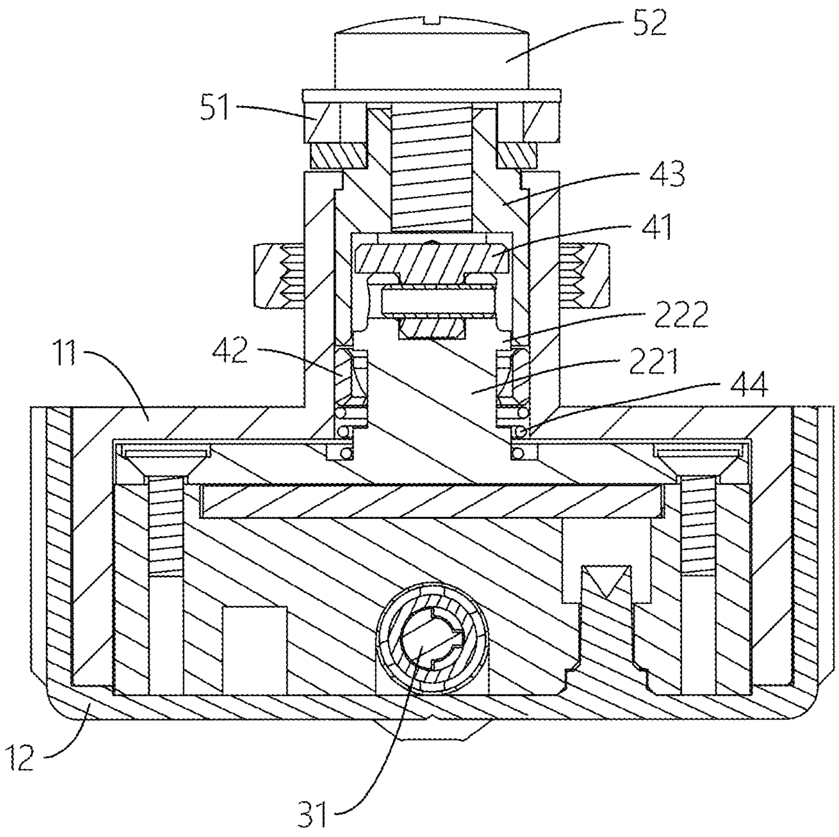
FIG. 11 is an upper sectional view of the anti-vandal combination rotary lock in FIG. 1, shown in the unlocked state.
Figure 12:
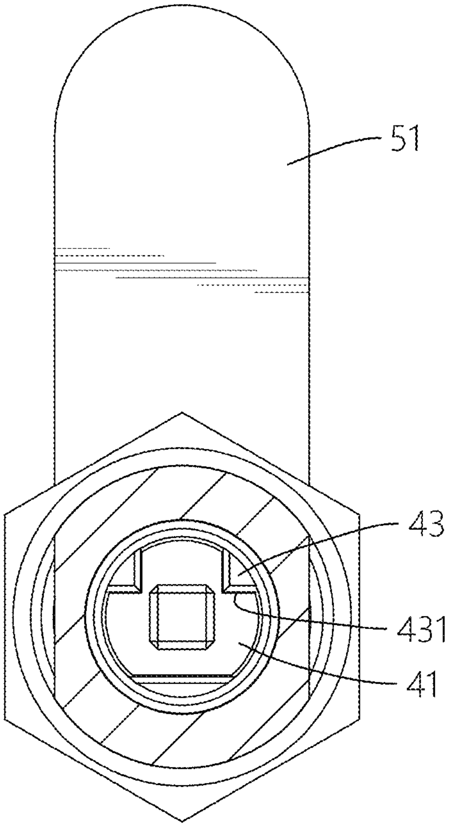
FIG. 12 is a front sectional view of the anti-vandal combination rotary lock in FIG. 1, shown in the unlocked state.
Figure 13:
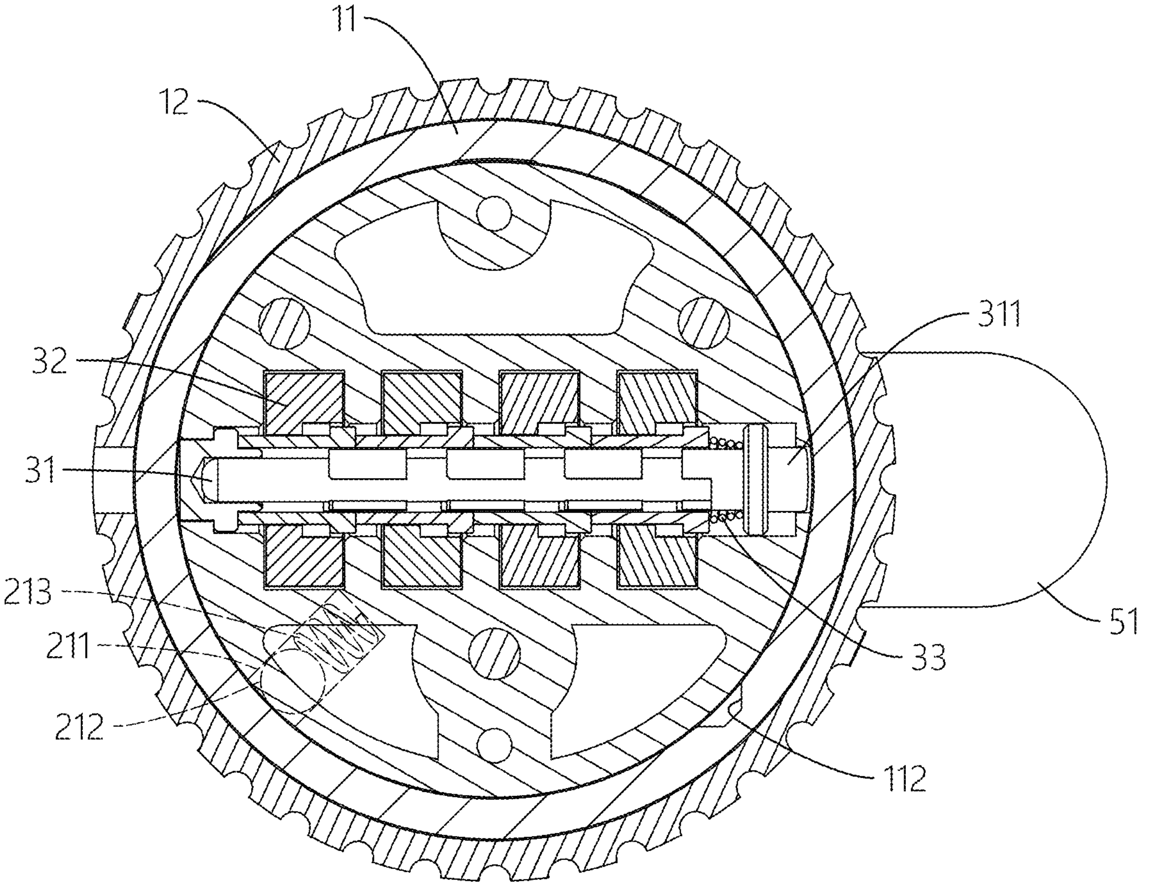
FIG. 13 is another front sectional view of the anti-vandal combination rotary lock in FIG. 1, shown in the unlocked state.

With reference to FIG. 1 to FIG. 3, an anti-vandal combination rotary lock in accordance with the present invention comprises a lock casing 11, a front cover 12, a lock core seat 20, a combination lock assembly 30, and a clutch assembly 40.

An accommodation space is formed inside the lock casing 11. A front end of the lock casing 11 is an open end, and a back end-surface of the lock casing 11 is a closed end. The lock casing 11 comprises an outer sleeve 111, a sliding slot 112, at least one locating slot 113, and a limiting slot 114. The outer sleeve 111 is mounted on the back end-surface of the lock casing 11 and communicates with the accommodation space. The sliding slot 112 is concavely formed on an inner wall of the lock casing 11. Two ends of the sliding slot 112 respectively extend to the front end of the lock casing 11 and the back end-surface of the lock casing. The locating slot 113 is concavely formed on an inner wall of the outer sleeve 111. Each one of the locating slots 113 communicates with the accommodation space of the lock casing 11. The limiting slot 114 is concavely formed on the inner wall of the lock casing 11, and a bottom of the limiting slot 114 is a concaved curved surface.

The front cover 12 sleeves the lock casing 11 from the front end of the lock casing 11 and can rotate and move forward and backward relative to the lock casing 11. A back end the front cover 12 is an open end and is configured to contain the lock casing 11. A front end 121 of the front cover 12 is a closed end. The front cover 12 comprises multiple character windows 122. The character windows 122 are sequentially formed on the front end 121 of the front cover 12.

The lock core seat 20 is mounted in the accommodation space of the lock casing 11. The lock core seat 20 is fixed with the front cover 12 and can rotate and move forward and backward with the front cover 12 relative to the lock casing 11. The lock core seat 20 comprises an inner rod 221, a ball channel 211, and multiple wheel slots 214. The inner rod 221 extends backward along an axial direction from a back end-surface of the lock core seat 20 and can reach into the corresponding outer sleeve 111 of the lock casing 11. At least one aligning convex part 222 is mounted on an outer surface of the inner rod 221. The ball channel 211 is concavely formed on an outer surface of the lock core seat 20, and a ball 212 and a locating elastic unit 213 are in the ball channel 211. Two ends of the locating elastic unit 213 respectively abut a bottom of the ball channel 211 and the ball 212. In a natural state, the locating elastic unit 213 pushes the ball 212 to move outward the ball channel 211. Precisely, the locating elastic unit 213 can be a compression spring. Therefore, the ball 212 is pushed against the inner wall of the lock casing 11. When the lock core seat 20 rotates relative to the lock casing 11 until the ball 212 moves into the sliding slot 112 of the lock casing 11, the user can know that the front cover 12 and the lock core seat 20 have been rotated to a predetermined angular position. The wheel slots 214 are respectively corresponding to the character windows 122 of the front cover 12 in location, and each one of the wheel slots 214 is formed through a front end-surface of the lock core seat 20.

In this embodiment, the lock core seat 20 comprises a base seat 21, a fixing plate 22, and a locating plate 23. The base seat 21 is substantially a cylinder. The base seat 21 is fixed with the front cover 12 and can rotate and move forward and backward with the front cover 12 relative to the lock casing 11. A front end-surface of the base seat 21 and a back end-surface of the base seat 21 are two opposite ends of the base seat 21. The front end-surface of the base seat 21 is the front end-surface of the lock core seat 20, and the front end-surface of the base seat 21 faces the front end 121 of the front cover 12. The ball channel 211 is concavely formed on an outer surface of the base seat 21 of the lock core seat 20. Each one of the wheel slots 214 is formed through from the front end-surface of the base seat 21 to the back end-surface of the base seat 21. The fixing plate 22 is fixed on the back end-surface of the base seat 21, and the inner rod 221 axially extends backward from the fixing plate 22. The locating plate 23 is clamped between the back end-surface of the base seat 21 and the fixing plate 22. Multiple elastic pieces 231 are formed on the locating plate 23, and locations of the elastic pieces 231 are respectively corresponding to the locations of the wheel slots 214 of the base seat 21.

The combination lock assembly 30 is mounted on the front end-surface of the lock core seat 20, that is, the combination lock assembly 30 is mounted on the front end-surface of the base seat 21. The combination lock assembly 30 comprises a limiting shaft 31, multiple character wheels 32, and a limiting elastic unit 33. The limiting shaft 31 can move along an axial direction of the limiting shaft 31 relative to the lock core seat 20, and the limiting shaft 31 comprises a limiting end 311.

The character wheels 32 sleeve the limiting shaft 31 and are respectively mounted in the wheel slots 214 of the base seat 21. Each one of the character wheels 32 protrudes from the corresponding character window 122 of the front cover 12 and can rotate relative to the limiting shaft 31. When all the character wheels 32 rotate relative to the limiting shaft 31 to corresponding unlocked angles respectively, the character wheels 32 and the limiting shaft 31 are unlocked, so that the limiting shaft 31 can move axially. When any one of the character wheels 32 is rotated away from the corresponding unlocked angle, the character wheels 32 and the limiting shaft 31 are locked with each other, so that the limiting shaft 31 cannot move axially. There are characters on each one of the character wheels 32. The user can determine the angular position of the character wheels 32 relative to the limiting shaft 31 according to the characters on the character wheels 32 facing the outside of the front cover 12.

The limiting elastic unit 33 sleeves the limiting shaft 31. Two opposite ends of the limiting elastic unit 33 respectively abut the limiting shaft 31 and one of the corresponding character wheels 32. In a natural state, the limiting elastic unit 33 pushes the limiting shaft 31 to move axially, so that the limiting end 311 of the limiting shaft 31 abuts the inner wall of the lock casing 11.

Therefore, when each one of the character wheels 32 is rotated to the unlocked angle at which the limiting shaft 31 is unlocked, the combination lock assembly 30 is in an unlocked state. At this time, the limiting shaft 31 can move axially, and the limiting elastic unit 33 can push against the limiting shaft 31, so that the limiting end 311 of the limiting shaft 31 abuts the inner wall of the lock casing 11. When a location of the limiting end 311 is corresponding to a location of the limiting slot 114 of the lock casing 11, the limiting shaft 31 is pushed by the limiting elastic unit 33 and extends into the limiting slot 114. When any of the character wheels 32 is rotated away from the unlocked angle, the combination lock assembly 30 is in a locked state. When the limiting end 311 of the limiting shaft 31 extends into the limiting slot 114 of the lock casing 11, the combination lock assembly 30 is set to the locked state, and the limiting shaft 31 cannot move axially, that is, the limiting shaft 31 cannot be pressed by the inner wall of the lock casing 11 and retract into the lock core seat 20. At this time, the user cannot rotate or move the lock core seat 20 and the combination lock assembly 30 on the lock core seat 20 forward or backward through the front cover 12.

The clutch assembly 40 is mounted between the outer sleeve 111 of the lock casing 11 and the inner rod 221 of the lock core seat 20, and the clutch assembly 40 comprises a connecting unit 41, a fixing ring 42, a connecting sleeve 43, and a clutch elastic unit 44.

The connecting unit 41 is mounted on a back end-surface of the inner rod 221. A cross-section of the connecting unit 41 is non-circular, and said cross-section of the connecting unit 41 refers to a cross-section perpendicular to the axial direction of the inner rod 221.

The fixing ring 42 sleeves the inner rod 221 and is located between the connecting unit 41 and the at least one aligning convex part 222 of the inner rod 221 of the lock core seat 20. The fixing ring 42 is fixedly connected to the outer sleeve 111 and comprises a front end-surface, a back end-surface, at least one locating convex part 421, and at least one aligning slot 422. The front and back end-surfaces of the fixing ring 42 are two opposite ends of the fixing ring 42, and the front end-surface of the fixing ring 42 faces the back end-surface of the lock core seat 20. The at least one locating convex part 421 is mounted on an outer surface of the fixing ring 42, and each one of the at least one locating convex part 421 is correspondingly engaged in a respective one of the at least one locating slot 113 of the lock casing 11. The at least one aligning slot 422 is concavely formed on an inner surface of the fixing ring 42. Each one of the at least one aligning slot 422 is formed through from the front end-surface of the fixing ring 42 to the back end-surface of the fixing ring 42, and a width of each one of the at least one aligning slot 422 is tapered from the front end-surface of the fixing ring 42 toward the back end-surface of the fixing ring 42.

The connecting sleeve 43 is rotatably mounted in the outer sleeve 111 of the lock casing 11 and comprises a front end-surface, a back end, and a connecting recess 431. The back end of the connecting sleeve 43 protrudes from the outer sleeve 111 and is connected to a lock tongue 51. A fixing unit 52 is mounted through the lock tongue 51 and is fixedly connected to the back end of the connecting sleeve 43. The connecting recess 431 is concavely formed on the front end-surface of the connecting sleeve 43. A cross-section of the connecting recess 431 is non-circular. Said cross-section of the connecting recess 431 refers to a cross-section perpendicular to the axial direction of the outer sleeve 111, and a shape of the cross-section of the connecting recess 431 matches a shape of the cross-section of the connecting unit 41. Therefore, the lock core seat 20 can drive the connecting unit 41 to move into the connecting recess 431 of the connecting sleeve 43, so that the connecting unit 41 and the connecting sleeve 43 are engaged and connected with each other, and the lock core seat 20 can drive the lock tongue 51 to rotate through the connecting sleeve 43.

The clutch elastic unit 44 sleeves the inner rod 221 of the lock core seat 20. Two ends of the clutch elastic unit 44 respectively abut the back end-surface of the lock core seat 20 and the lock casing 11. In this embodiment, the clutch elastic unit 44 abuts the fixing ring 42 of the lock casing 11. Therefore, in a natural state, the clutch elastic unit 44 pushes the lock core seat 20 and the front cover 12 to move toward the front end of the lock casing 11. Since the fixing ring 42 is limited between the connecting unit 41 and the at least one aligning convex part 222 of the inner rod 221 of the lock core seat 20, the lock core seat 20 and the front cover 12 will not be separated from the lock casing 11 due to the push of the clutch elastic unit 44.

When the lock core seat 20 drives the connecting unit 41 to move into the connecting recess 431 of the connecting sleeve 43, each one of the at least one aligning convex part 222 of the inner rod 221 of the lock core seat 20 can move along one of the corresponding at least one aligning slot 422 of the fixing ring 42, so that the connecting unit 41 can be engaged with the connecting sleeve 43 at a correct angular position. The design of the at least one locating convex part 421 of the fixing ring 42 and the corresponding at least one locating slot 113 of the lock casing 11 can fix the fixing ring 42 in the outer sleeve 111 of the lock casing 11 at a specific angular position to align with the at least one aligning convex part 222 of the inner rod 221 of the lock core seat 20 corresponding to the position.

To use the anti-vandal combination rotary lock, the user must first adjust the combination lock assembly 30 to the unlocked state by entering the correct password, so that the limiting shaft 31 can move axially. In the unlocked state, when the user holds and presses the front cover 12, the limiting shaft 31 will move along the bottom of the limiting slot 114 of the lock casing 11 to the inner wall of the lock casing 11, and will be gradually pressed into the lock core seat 20. Through the front cover 12 and the lock core seat 20, the connecting unit 41 is driven to move into the connecting sleeve 43, so that the connecting unit 41 and the connecting sleeve 43 are engaged and connected with each other. Then, by rotating the front cover 12, the lock core seat 20, the connecting sleeve 43, and the lock tongue 51 are sequentially driven to rotate, and then the lock tongue 51 is rotated to the unlocked position or the locked position.

If the combination lock assembly 30 is in the locked state (that is, the password entered is incorrect), the limiting shaft 31 cannot move axially and cannot be pressed into the lock core seat 20. At this time, the limiting end 311 of the limiting shaft 31 will be restricted in the limiting slot 114 of the lock casing 11, so that the lock casing 11 cannot drive the lock core seat 20 and the connecting unit 41 to move to the connecting sleeve 43. A person who does not know the correct password can only drive the front cover 12 and the lock core seat 20 to idle, but cannot further forcefully apply torque to drive the connecting sleeve 43 and the lock tongue 51 to rotate.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An anti-vandal combination rotary lock comprising:

a lock casing; a front end of the lock casing being an open end, and a back end-surface of the lock casing being a closed end; the lock casing comprising:

an outer sleeve mounted on the back end-surface of the lock casing; and a limiting slot concaved on an inner wall of the lock casing, and a bottom of the limiting slot being a concaved curved surface;

a front cover sleeving the lock casing from the front end of the lock casing and being capable of rotating and moving forward and backward relative to the lock casing; a back end of the front cover being an open end, and said back end of the front cover configured to contain the lock casing; a front end of the front cover being a closed end; the front cover comprising:

multiple character windows formed on the front end of the front cover;

a lock core seat mounted in the lock casing; the lock core seat and the front cover fixed to each other; the lock core seat comprising:

an inner rod extending backward along an axial direction from a back end-surface of the lock core seat and being capable of extending into the outer sleeve of the lock casing; and multiple wheel slots respectively corresponding to the character windows of the front cover in location; each one of the wheel slots formed through a front end-surface of the lock core seat;

a combination lock assembly mounted on the front end-surface of the lock core seat, and the combination lock assembly comprising:

a limiting shaft being capable of moving axially along an axial direction of the limiting shaft relative to the lock core seat; the limiting shaft comprising a limiting end;

multiple character wheels sleeving the limiting shaft and respectively mounted in the wheel slots of the lock core seat; each one of the character wheels being capable of rotating relative to the limiting shaft; wherein when all the character wheels are rotated relative to the limiting shaft to corresponding unlocked angles respectively, the character wheels and the limiting shaft are unlocked, so that the limiting shaft is capable of moving axially; when any one of the character wheels is rotated away from the corresponding unlocked angle, the character wheels and the limiting shaft are locked with each other, so that the limiting shaft is axially unmovable; and a limiting elastic unit sleeving the limiting shaft; two opposite ends of the limiting elastic unit respectively abutting the limiting shaft and one of the character wheels; the limiting elastic unit making the limiting shaft move axially, so that the limiting end of the limiting shaft abuts the inner wall of the lock casing; and a clutch assembly mounted between the outer sleeve of the lock casing and the inner rod of the lock core seat and comprising:

a connecting unit mounted on a back end of the inner rod, and a cross-section of the connecting unit being non-circular;

a connecting sleeve rotatably mounted in the outer sleeve of the lock casing, and the connecting sleeve comprising a front end, a back end, and a connecting recess; the back end of the connecting sleeve protruding from the outer sleeve and connected to a lock tongue; the connecting recess concavely formed on the front end of the connecting sleeve; a cross-section of the connecting recess being non-circular, and a shape of said cross-section of the connecting recess matching a shape of the cross-section of the connecting unit; the connecting unit being capable of being driven to move into the connecting recess and engaged with the connecting sleeve; and a clutch elastic unit sleeving the inner rod of the lock core seat; two ends of the clutch elastic unit respectively abutting the back end-surface of the lock core seat and the lock casing.

2. The anti-vandal combination rotary lock as claimed in claim 1, wherein:

the lock casing comprises:

at least one locating slot concavely formed on an inner wall of the outer sleeve;

the lock core seat comprises:

at least one aligning convex part mounted on an outer surface of the inner rod;

the clutch assembly comprises:

a fixing ring sleeving the inner rod and fixed with the outer sleeve; the fixing ring comprising:

at least one locating convex part mounted on an outer surface of the fixing ring; each one of the at least one locating convex part correspondingly engaged in a respective one of the at least one locating slot of the lock casing; and at least one aligning slot concavely formed on an inner surface of the fixing ring; each one of the at least one aligning slot formed through from a front end-surface of the fixing ring to a back end-surface of the fixing ring; a width of each one of the at least one aligning slot tapered from the front end-surface of the fixing ring toward the back end-surface the fixing ring;

each one of the at least one aligning convex part of the lock core seat is capable of moving into a respective one of the at least one aligning slot of the fixing ring.

3. The anti-vandal combination rotary lock as claimed in claim 2, wherein the lock core seat comprises:

a base seat fixed with the front cover; a front end-surface of the base seat being said front end-surface of the lock core seat; each one of the wheel slots formed through from the front end-surface of the base seat to a back end of the base seat;

a fixing plate fixed on an end of the base seat, and the inner rod axially extending backward from the fixing plate; and a locating plate clamped between the back end-surface of the base seat and the fixing plate; multiple elastic pieces formed on the locating plate, and locations of the elastic pieces respectively corresponding to the locations of the wheel slots of the base seat.

4. The anti-vandal combination rotary lock as claimed in claim 3, wherein:

the lock casing comprises:

a sliding slot concavely formed on the inner wall of the lock casing; two ends of the sliding slot respectively extending toward the front end of the lock casing and the back end-surface of the lock casing;

the lock core seat comprises:

a ball channel concavely formed on an outer surface of the lock core seat;

a ball in the ball channel; and a locating elastic unit in the ball channel; two ends of the locating elastic unit respectively abutting a bottom of the ball channel and the ball; the locating elastic unit pushing the ball to move outward the ball channel and against the inner wall of the lock casing, and the ball being capable of moving into the sliding slot of the lock casing.

5. The anti-vandal combination rotary lock as claimed in claim 4, wherein the ball channel concavely formed on an outer surface of the base seat of the lock core seat.

6. The anti-vandal combination rotary lock as claimed in claim 2, wherein:

the lock casing comprises:

a sliding slot concavely formed on the inner wall of the lock casing; two ends of the sliding slot respectively extending toward the front end of the lock casing and the back end-surface of the lock casing;

the lock core seat comprises:

a ball channel concavely formed on an outer surface of the lock core seat;

a ball in the ball channel; and a locating elastic unit in the ball channel; two ends of the locating elastic unit respectively abutting a bottom of the ball channel and the ball; the locating elastic unit pushing the ball to move outward the ball channel and against the inner wall of the lock casing, and the ball being capable of moving into the sliding slot of the lock casing.

7. The anti-vandal combination rotary lock as claimed in claim 1, wherein the lock core seat comprises:

a base seat fixed with the front cover; a front end-surface of the base seat being said front end-surface of the lock core seat; each one of the wheel slots formed through from the front end-surface of the base seat to a back end of the base seat;

a fixing plate fixed on an end of the base seat, and the inner rod axially extending backward from the fixing plate; and a locating plate clamped between the back end-surface of the base seat and the fixing plate; multiple elastic pieces formed on the locating plate, and locations of the elastic pieces respectively corresponding to the locations of the wheel slots of the base seat.

8. The anti-vandal combination rotary lock as claimed in claim 7, wherein:

the lock casing comprises:

a sliding slot concavely formed on the inner wall of the lock casing; two ends of the sliding slot respectively extending toward the front end of the lock casing and the back end-surface of the lock casing;

the lock core seat comprises:

a ball channel concavely formed on an outer surface of the lock core seat;

a ball in the ball channel; and a locating elastic unit in the ball channel; two ends of the locating elastic unit respectively abutting a bottom of the ball channel and the ball; the locating elastic unit pushing the ball to move outward the ball channel and against the inner wall of the lock casing, and the ball being capable of moving into the sliding slot of the lock casing.

9. The anti-vandal combination rotary lock as claimed in claim 8, wherein the ball channel concavely formed on an outer surface of the base seat of the lock core seat.

10. The anti-vandal combination rotary lock as claimed in claim 1, wherein:

the lock casing comprises:

a sliding slot concavely formed on the inner wall of the lock casing; two ends of the sliding slot respectively extending toward the front end of the lock casing and the back end-surface of the lock casing;

the lock core seat comprises:

a ball channel concavely formed on an outer surface of the lock core seat;

a ball in the ball channel; and a locating elastic unit in the ball channel; two ends of the locating elastic unit respectively abutting a bottom of the ball channel and the ball; the locating elastic unit pushing the ball to move outward the ball channel and against the inner wall of the lock casing, and the ball being capable of moving into the sliding slot of the lock casing.

* * * * *